July 8, 1958  R. T. BENSON ET AL  2,842,374
REVOLVING SEAT STROLLER

Filed May 3, 1956  3 Sheets-Sheet 1

INVENTOR.
EDWARD J. BOYSEL
RICHARD T. BENSON

BY Alfred R. Fuchs
ATTORNEY

INVENTOR.
EDWARD J. BOYSEL
RICHARD T. BENSON
BY Alfred R. Fuchs
ATTORNEY

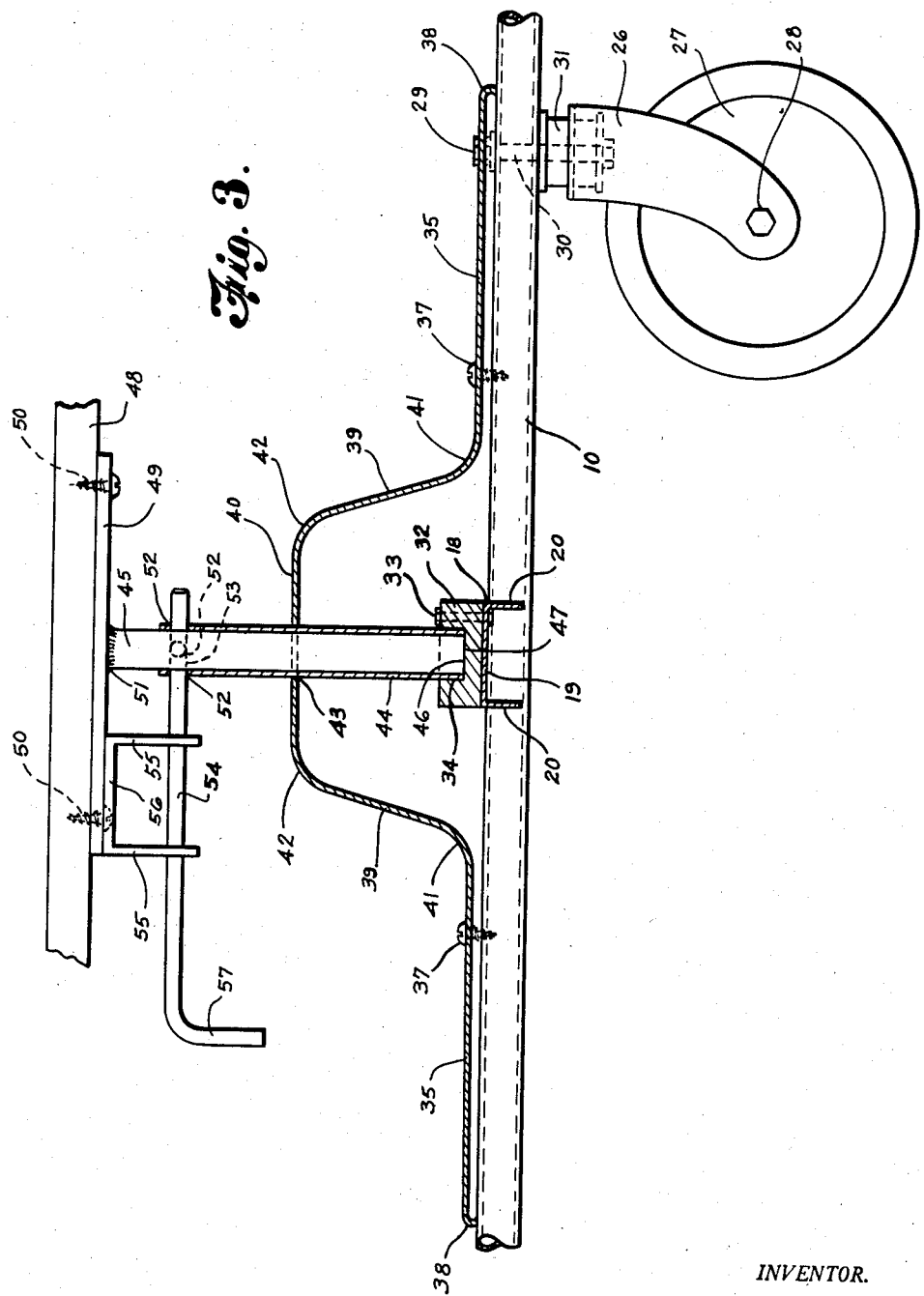

United States Patent Office 2,842,374
Patented July 8, 1958

2,842,374

REVOLVING SEAT STROLLER

Richard T. Benson, Kansas City, and Edward J. Boysel, Sedalia, Mo.; said Benson assignor to said Boysel Application May 3, 1956, Serial No. 582,360

5 Claims. (Cl. 280—47.39)

Our invention relates to juvenile vehicles, and more particularly to a revolving seat stroller.

It is a purpose of our invention to provide a stroller that is provided with confining means for a child embodying a seat that is rotatably mounted so that the child can turn the seat on its mounting in such a way as to face in any desired direction relative to the vehicle. Our invention also provides means for amusing a small child, by providing a rotatable mounting for a seat in a juvenile vehicle, the rotatable mounting providing means for amusing a small child for long periods of time while confined in the vehicle in such a manner that no harm can come to the child. Our invention is an improvement over the vehicle shown in the patent to Edward J. Boysel, patented March 17, 1953, No. 2,631,651, on Revolving Seat Juvenile Vehicle.

It is an important purpose of our invention to provide a vehicle of the above mentioned character having a revolving seat that is simple in construction and that can be manufactured at low cost. In order to accomplish this purpose and to provide a platform on the vehicle with which the feet of the child seated therein can always come in contact for rotating the seat, we provide a swivel mounting for the seat that is mounted concentrically with a circular platform provided on the frame and provide a simple yet strong and inexpensive swivel mounting for the seat on said platform, comprising a dome-like member located centrally of the platform serving as bracing means for a socket for a pivot pin extending downwardly from the seat. To further simplify the construction, reduce the weight and cost of construction of the vehicle, the socket member comprises a tubular member that is mounted in a block on a transverse frame member of the vehicle in such a manner that said block serves as a thrust bearing at the bottom of the socket, with which the lower end of the pivot pin engages in order to provide a swivel mounting for the seat.

It is a further purpose of our invention to provide a light, strong, relatively cheap, structure embodying such a swivelly mounted seat at the center of a circular platform having stiffening means at its peripheral edge, said platform cooperating with said transverse frame member to brace the frame transversely thereof at a plurality of points.

It is a further purpose of our invention to provide a swivel seat on a vehicle of the above mentioned character, that comprises a bottom member that has a bracket secured thereto on the under side thereof, on which a depending pivot pin is mounted in fixed position, as by welding, and which has guard means to confine the child in the seat comprising side members and a transverse portion, said side members being connected with an upstanding flat back at the rear ends thereof, the transverse portion being connected with said side members.

Other objects and advantages of our invention will appear as the description of the drawings proceeds. We desire to have it understood, however, that we do not intend to limit ourselves to the particular details shown or described, except as defined in the claims.

Fig. 3 is a view partly in vertical section and partly in elevation, portions thereof being broken away, said view being on a larger scale than Figs. 1 and 2.

Figure 1:
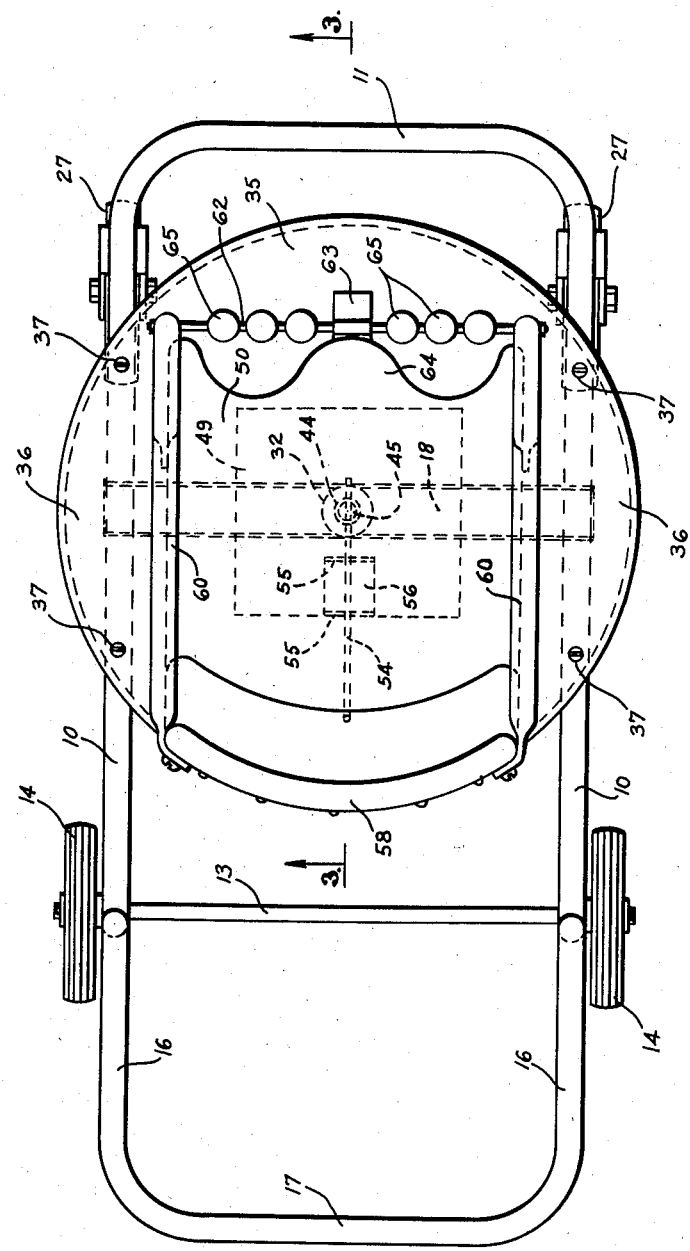
Fig. 1 is a plan view of our improved vehicle.
Figure 2:
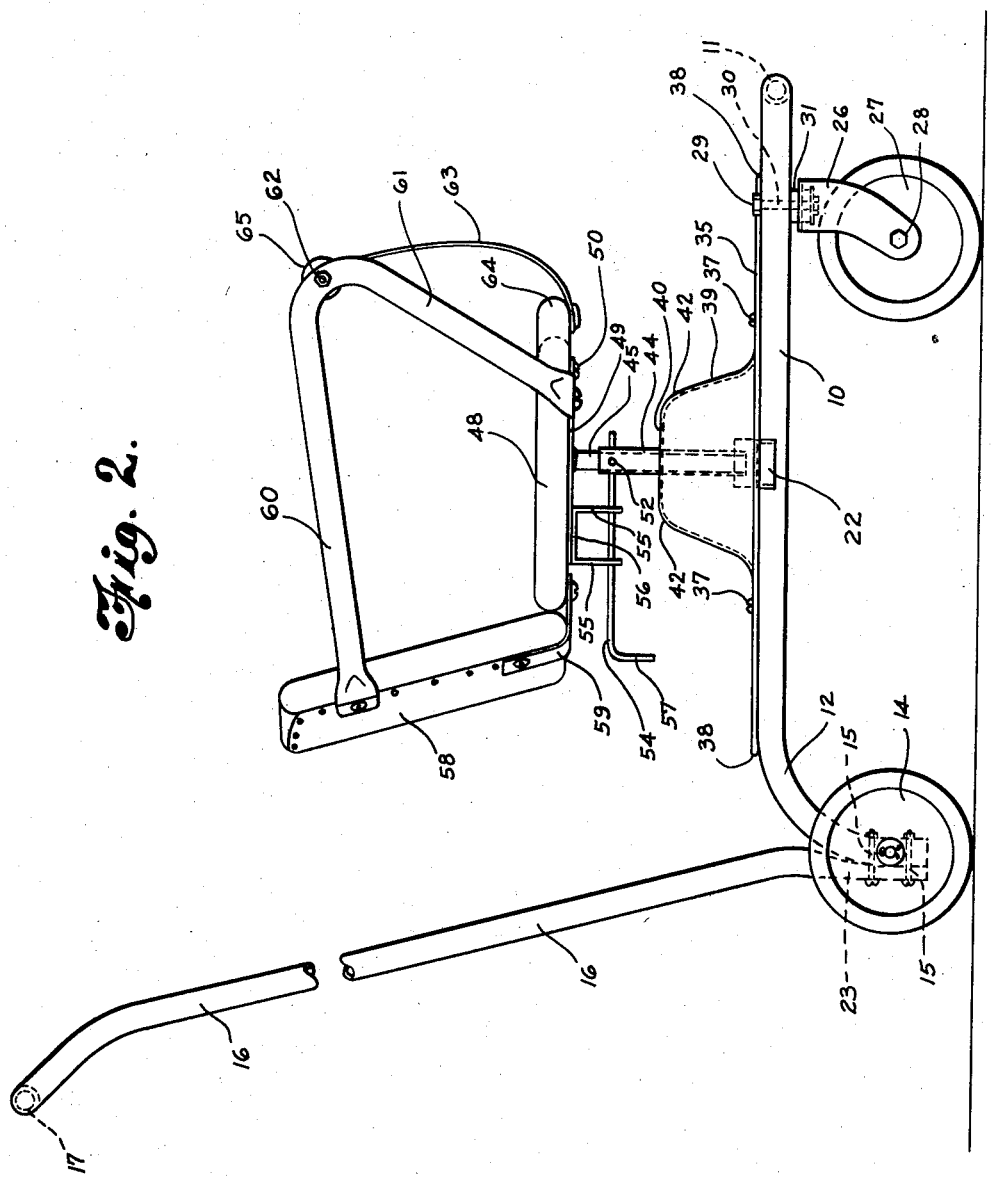
Fig. 2 is a side elevation thereof, partly broken away.

Referring in detail to the drawings, our improved revolving seat stroller comprises a frame having longitudinally extending tubular frame members 10, which are connected at their forward ends by a transversely extending portion 11. Said longitudinal side members 10 have downwardly extending rear end portions 12, between which extends the rear axle 13, which is preferably welded to the frame portions 12, and is provided with suitable wheels 14. Secured by means of bolts 15 to the downturned portions 12 of the frame is an upstanding handle 16 having a transverse portion 17.

A transverse frame member 18 is also provided, which connects the longitudinal frame members 10, said frame member being channel-shaped in cross section and having the web portion 19 thereof extending horizontally, with the flanges 20 in depending relation thereto. The top face of the transverse portion 19 of said frame member is substantially flush with the top edge of the frame members 10, having a pair of ears 22 at opposite ends thereof extending partially around the frame members 10 and being welded thereto, said ears being continuations of the web portion 19, and being fixed to said frame members 10, as by welding. The lower end portions 23 of the handle portion are flattened on the sides thereof that engage the downturned portions 12 of the frame members 10.

At their forward ends the frame members 10 are provided with swivel brackets 26 of a standard character for the wheels 27, which are mounted for rotation on stub axles 28 provided on said swivel brackets. The swivel brackets are swivelly mounted in a well known manner on the pivot pins 30 that have the heads 29 thereon, said pivot pins being clamped to the frame members 10 by means of the members 31 cooperating with the heads 29. It will be noted that when the wheels 27 are in a straight forward position, as shown in the drawings, the wheels are in vertical alignment with the frame members 10.

A block 32 is mounted on the transverse frame member 18 in fixed position, as by means of bolts 33, one of which is shown in Fig. 3. The block 32 is provided with a central circular recess or socket 34, said block being mounted midway between said frame members 10 and said socket 34 being located on the longitudinal center line of the frame. A sheet metal platform 35 is also mounted on the frame members 10. Said platform is concentrically arranged with respect to the socket 34, as will be obvious from Fig. 1, and has portions 36 that extend laterally beyond the side members 10 of the frame. The sheet metal platform 35 is secured to the longitudinal frame members 10 by screw-threaded headed fastening elements 37, at longitudinally spaced points. The platform 35 and frame members 10 brace each other, the portions of the platform 35 between the frame members 10 serving as additional transverse bracing means to the frame member 18. Said platform 35 preferably has a bead 38 formed along its peripheral edge to stiffen said peripheral portion thereof, said bead turning inwardly and downwardly to provide a smooth circumferential edge on said platform.

The platform 35 has an upwardly inclined annular wall 39 and a transverse wall 40 offset from the outer portion of said platform, to further stiffen the same and provide a dome-like central portion on said platform 35 concentric with the socket 34. Thus a central circular dome-like member integral with said platform 35 is provided. Said dome-like member has a concavely curved portion 41 extending upwardly from the flat portion of the platform 35, the inclined wall portion 39 extending from the concave wall portion to a convex wall portion 42 that connects the transverse top wall 40 with the inclined wall 39. The transverse top wall has a central opening 43 therein. A tubular socket member 44 has its lower end seated in the socket 34 and extends through the opening 43, closely fitting both said socket and opening. If desired the socket member 44 can be fixed to the block 32, as by brazing.

It will be noted that the dome-like member formed centrally thereof, will greatly stiffen the platform, and that these parts can be made of light gauge sheet metal and still have the desired strength for supporting the socket member 44 in a vertical position. It will be noted that the tubular socket member 44 extends slightly above the top wall 40 of the dome-like member.

A pivot pin 45 is mounted in the socket 44 and has a flat bottom end 46 engaging the bottom 47 of the socket 34. The pivot pin 45 is mounted on the bottom 48 of the seat, by means of a flat rectangular plate 49 secured to the flat under side of the seat by means of the screws 50, said pivot pin being welded or brazed to said plate 49, as shown at 51.

It will be noted that the pin 45 is of such length with respect to the socket 44 as to space the plate 49 from the top end of the socket 44. The seat is thus swivelly mounted in the center of the platform 35. This provides a platform that extends the same distance from the seated child for any position that the child may take relative to the patform as it turns the seat around on the axis of the pivot pin 48. In the ordinary stroller, in which the foot board or platform is usually either of less width or as wide as the frame, a child can stick its feet between the platform and the wheels, particularly the swiveled wheels at the forward end of the vehicle, and injure its foot in that manner. This is impossible with the location of the wheels provided in the present device and with the platform of a circular character, with the seat mounted in the center of the platform and the platform extending outwardly over the frame so as to make it impossible for a child to get its foot out beyond the platform, unless the child is entirely too large for the vehicle.

The socket 44 has diametrically opposed openings 52 therein adjacent its upper end and the pivot pin has a transverse opening 53 therethrough adapted to align with any pair of said openings 52. A bolt 54 is adapted to be passed through the openings 52 and the passage 53, being held in alignment with the passage 53 by means of aligning openings in depending legs 55 of U-shaped bracket 56 mounted on the plate 49, as by welding or brazing. Said bolt has an integral handle 57 thereon for sliding it into and out of position to lock the seat against rotation. The seat has a back 58 secured to the bottom 48 by means of brackets 59, and is provided with confining means comprising the side members 60, having downwardly rearwardly inclined portions 61 secured to the seat bottom 48, and a forward cross bar 62, to which a strap 63 is centrally secured. The lower end of said strap 63 is secured to the under side of the central forward projection 63 on the seat. If desired, slidable balls 65 may be provided on the member 62 for amusement purposes and also to serve as ornamentation.

What we claim is:

1. In a vehicle of the character described, a wheeled frame, a platform mounted on said frame, a seat, and means for mounting said seat in upwardly spaced relation to said platform to swivel about an axis centrally located relative to said platform, comprising a dome-like portion on said platform and extending centrally upwardly therefrom, said dome-like portion having a central opening in the top thereof, an upstanding tubular socket member mounted on said frame and extending upwardly through said opening in said dome-like portion, said tubular member closely fitting in said opening and extending upwardly beyond said dome-like portion, means closing the bottom end of said socket, a pivot pin mounted on said seat and extending downwardly therefrom into said socket into engagement with said means for closing the bottom end of said socket.

2. In a vehicle of the character described, a wheeled frame, a circular platform mounted on said frame, a seat, and means for mounting said seat in upwardly spaced relation to said platform to swivel about an axis centrally located relative to said platform, comprising a dome-like portion on said platform extending centrally upwardly therefrom, and having a central opening in the top thereof, an upstanding tubular socket member extending through said opening in said dome-like portion, a transverse frame member, a block mounted thereon having a socket therein closely receiving the lower end of said tubular socket member and closing the bottom end of said tubular socket, said tubular member closely fitting in said opening and extending upwardly beyond said dome-like portion, and a pivot pin mounted on said seat and extending downwardly therefrom into rotative engagement with said tubular socket with its bottom end seated on the bottom of the socket in said block.

3. In a vehicle of the character described, a wheeled frame, a platform mounted on said frame, a seat, and means for mounting said seat in upwardly spaced relation to said platform to swivel about an axis centrally located relative to said platform, comprising a dome-like portion on said platform centrally upwardly offset therefrom, said dome-like portion having a central opening in the top thereof, an upstanding tubular socket member closely fitting said opening and extending upwardly from said frame through said opening in said dome-like portion, and above the top thereof, means for mounting said tubular member on said frame comprising a block on said frame at the bottom end of said socket, a plate mounted on the under side of said seat and a pivot pin fixed to said plate, said pivot pin extending downwardly from said plate into said socket, said block supporting said pivot pin with said plate in spaced relation to the upper end of said socket member.

4. In a vehicle of the character described, a wheeled frame comprising longitudinal frame members, a transverse frame member extending between said longitudinal frame members and secured thereto, said transverse frame member having a block mounted thereon having a circular recess in the top side thereof, a circular platform mounted on said frame and extending laterally beyond said longitudinal frame members, a seat, and means for mounting said seat in upwardly spaced relation to said platform to swivel about an axis centrally located relative to said platform, comprising a dome-like portion on said platform extending centrally upwardly therefrom, said dome-like portion having a central opening in the top thereof, an upstanding tubular socket member mounted on said block in said recess and extending upwardly therefrom through said opening in said dome-like member, said tubular member closely fitting in said opening, the bottom wall of said recess closing the bottom end of said tubular socket, and a pin mounted on said seat and extending downwardly therefrom into rotative engagement with said socket.

5. In a vehicle of the character described, a wheeled frame comprising longitudinal frame members, a transverse frame member extending between said longitudinal frame member and secured thereto, said transverse frame member having a block mounted thereon having a circular recess in the top side thereof, a circular platform rigidly mounted on said frame and extending laterally beyond said longitudinal frame members, a seat, and means for mounting said seat in upwardly spaced relation to said platform to swivel about an axis centrally located relative to said platform, comprising a dome-like portion on said platform extending centrally upwardly therefrom, said dome-like portion having a central opening in the top thereof, an upstanding tubular socket member mounted on said block fitting in said recess extending upwardly therefrom through said opening in said dome-like member, said tubular member closely fitting in said opening, the bottom wall of said recess closing the bottom end of said tubular socket and a pin mounted on said seat and extending downwardly therefrom into rotative engagement with said socket, said circular platform being secured to said longitudinal frame members at longitudinally spaced points and having a downwardly and inwardly directed peripheral bead thereon.

References Cited in the file of this patent

UNITED STATES PATENTS

| | | |
|---|---|---|
| 171,798 | Hale | Jan. 4, 1876 |
| 883,929 | Baxter | Apr. 7, 1908 |
| 916,080 | Wiekinson | Mar. 23, 1909 |
| 924,458 | Henry | June 8, 1909 |
| 1,395,698 | Peackock | Nov. 1, 1921 |
| 1,702,883 | Wilson | Feb. 19, 1929 |
| 2,593,962 | Barker | Apr. 22, 1952 |

FOREIGN PATENTS

| | | |
|---|---|---|
| 103,946 | Great Britain | July 17, 1916 |